(12) United States Patent
Wang

(10) Patent No.: US 11,626,757 B2
(45) Date of Patent: Apr. 11, 2023

(54) REVERSE WIRELESS CHARGING

(71) Applicant: STMicroelectronics (Shenzhen) R&D Co. Ltd., Shenzhen (CN)

(72) Inventor: Jiasheng Wang, Shenzhen (CN)

(73) Assignee: STMICROELECTRONICS (SHENZHEN) R&D CO. LTD., Shenzhen (CN)

( * ) Notice: Subject to any disclaimer, the term of this patent is extended or adjusted under 35 U.S.C. 154(b) by 168 days.

(21) Appl. No.: 16/931,137

(22) Filed: Jul. 16, 2020

(65) Prior Publication Data

US 2022/0021242 A1 Jan. 20, 2022

(51) Int. Cl.
*H02J 50/12* (2016.01)
*H02J 7/02* (2016.01)
*H02J 7/34* (2006.01)
*H02J 50/80* (2016.01)

(52) U.S. Cl.
CPC ............... *H02J 50/12* (2016.02); *H02J 7/02* (2013.01); *H02J 7/342* (2020.01); *H02J 50/80* (2016.02)

(58) Field of Classification Search
CPC ........................................................ H02J 7/342
USPC ......................................................... 320/108
See application file for complete search history.

(56) References Cited

U.S. PATENT DOCUMENTS

| 2010/0148723 | A1* | 6/2010 | Cook ................. G06K 19/0702 320/108 |
| 2013/0257360 | A1* | 10/2013 | Singh ...................... H01F 38/14 320/108 |
| 2015/0035372 | A1* | 2/2015 | Aioanei .................. H02J 50/12 307/104 |
| 2015/0180284 | A1* | 6/2015 | Kang ...................... H02J 7/025 307/104 |
| 2015/0207330 | A1 | 7/2015 | Peterson |
| 2020/0083737 | A1 | 3/2020 | Dai |
| 2022/0037926 | A1* | 2/2022 | Omori ................. H02J 7/00034 |

FOREIGN PATENT DOCUMENTS

| CN | 110994810 A | 4/2020 |
| CN | 111095723 A | 5/2020 |
| WO | 2019053924 A1 | 3/2019 |
| WO | 2020062159 A1 | 4/2020 |

OTHER PUBLICATIONS

Stmicroelectronics STWLC33, "Multi-mode Qi/AirFuel inductive wireless power receiver for 15 W applications with transmitter functions," Datasheet—Production data, Sep. 2017, 65 pages.

(Continued)

*Primary Examiner* — Edward Tso
*Assistant Examiner* — Ahmed H Omar
(74) *Attorney, Agent, or Firm* — Slater Matsil, LLP

(57) ABSTRACT

A method and system for operating a power circuit capable of transmitting and receiving wireless power. The method includes determining that the power circuit is operating in receive mode, and, based thereon, having a first equivalent capacitance. The method further includes determining that the power circuit is operating in the transmit mode, and, based thereon, having a second equivalent capacitance. The first equivalent capacitance being different than the second equivalent capacitance.

21 Claims, 4 Drawing Sheets

(56) References Cited

OTHER PUBLICATIONS

Varikkottil, Sooraj et al., "Estimation of Optimal Operating Frequency for Wireless EV Charging System under Misalignment," Electronics 2019, 8, 342, Dec. 25, 2018, 15 pages.
Smith, Nicholaus, et al., "White Paper—Tuning Qi® and AirFuel®/PMA® Inductive Resonance Circuits for Optimal Efficiency," Renesas Electronics Corporation, May 10, 2017, 8 pages.
Santos, Heitor M. et al., "Implementation of a Qi Compliant Wireless Power System for an Underwater Probe," White paper, IEEE Standards Education Committee, 2013, 9 pages.

* cited by examiner

REVERSE WIRELESS CHARGING

TECHNICAL FIELD

The present disclosure relates generally to wireless charging, and, in particular embodiments, to a system and method for reverse wireless charging.

BACKGROUND

Wireless power systems provide a method for wireless energy transfer between at least two devices. The transmitting device generates an electromagnetic field, and the receiving device receives the energy using inductive coupling. The receiving device stores the energy in a battery or consumes the power in a load.

The efficiency of the energy transfer primarily depends on the coupling factor between the transmit and receive side coils, the angle of the coils, the condition of the load or the battery, and the operating temperatures of the transmitting and receiving devices.

Reverse wireless charging refers to a feature that makes it possible for the receiving device, in a first wireless power system, to act as a transmitting device, in a second wireless power system. As an example, a first mobile device that is capable of reverse wireless charging can, on the one hand, charge itself when placed on a charging pad, and, on the other hand, can charge a second mobile device when the second mobile device is placed on (or near) the first mobile device. Thus, the first mobile device has the benefit of being able to function as the charging pad for the second mobile device.

Generally, a device capable of reverse wireless charging uses the same coil to receive and transmit wireless energy. The inductive-capacitive (LC) tank circuit that includes the shared coil in the two operating modes determines the resonant frequency of the device. This rigidity in the structure of the LC tank circuit diminishes the coupling factor during the transmit operating mode because the design is generally optimized for the receive operating mode.

A robust and reliable system and method for improved coupling in both transmit and receive operating modes in a device capable of reverse wireless charging is therefore desired.

SUMMARY

A first aspect relates to a method of operating a power circuit; the method includes the power circuit having a first mode and a second mode, respectively, corresponding to receiving and transmitting power using inductive charging at a coil of the power circuit. The method further includes determining that the power circuit is operating in the first mode, and, based thereon, coupling the coil in series with a parallel coupling of a first capacitor of the power circuit and a second capacitor of the power circuit. Additionally, the method includes determining that the power circuit is operating in the second mode, and, based thereon, coupling the coil in series with the first capacitor and coupling the second capacitor to a reference potential.

In a first implementation form of the method according to the first aspect, a tank circuit of the power circuit in the second mode includes the coil in series with the first capacitor. An equivalent capacitance and inductance, respectively, of the tank circuit in the second mode is about 300 nanofarad and 8 microhenries.

In a second implementation form of the method, according to the first aspect as such or any preceding implementation of the first aspect, a resonant frequency of the power circuit is determined in accordance with an equivalent inductance and capacitance of the tank circuit.

In a third implementation form of the method, according to the first aspect as such or any preceding implementation of the first aspect, the second capacitor is coupled to a switch in series. Coupling the coil in series with the parallel coupling of the first capacitor and the second capacitor includes setting the switch in a closed position.

In a fourth implementation form of the method, according to the first aspect as such or any preceding implementation of the first aspect, the second capacitor is coupled to a switch in series. Coupling the coil in series with the first capacitor and coupling the second capacitor to a reference potential includes setting the switch in an open position.

In a fifth implementation form of the method, according to the first aspect as such or any preceding implementation of the first aspect, the second capacitor is coupled to a switch in series. The switch includes a first transistor arranged in series with a second transistor.

In a sixth implementation form of the method, according to the first aspect as such or any preceding implementation of the first aspect, the determining that the power circuit is operating in the first mode or the second mode is in accordance with a signal received from an external device.

A second aspect relates to a device including a coil, a tank circuit, a non-transitory memory storage, and a process. The coil is configured to operate in a first mode and a second mode, respectively, corresponding to receiving and transmitting power using inductive charging. The tank circuit includes the coil, a first capacitor, and a second capacitor in the first mode. The tank circuit includes the coil and the second capacitor in the second mode. The non-transitory memory storage includes instructions. The processor is in communication with the non-transitory memory storage and executes the instructions to (1) determine that the coil is operating in the first mode, and, based thereon, coupling the coil in series with a parallel coupling of the first capacitor and the second capacitor and (2) determine that the coil is operating in the second mode, and, based thereon, coupling the coil in series with the first capacitor and coupling the second capacitor to a reference potential.

In a first implementation form of the device according to the first aspect as such, the tank circuit in the second mode includes the coil in series with the first capacitor. An equivalent capacitance and inductance, respectively, of the tank circuit in the second mode is about 300 nanofarad and 8 microhenries.

In a second implementation form of the device, according to the second aspect as such or any preceding implementation of the second aspect, the second capacitor is coupled to a switch in series. Coupling the coil in series with the parallel coupling of the first capacitor and the second capacitor includes setting the switch in a closed position.

In a third implementation form of the device, according to the second aspect as such or any preceding implementation of the second aspect, the second capacitor is coupled to a switch in series. Coupling the coil in series with the first capacitor and coupling the second capacitor to a reference potential includes setting the switch in an open position.

In a fourth implementation form of the device, according to the second aspect as such or any preceding implementation of the second aspect, the second capacitor is coupled to a switch in series. The switch includes a first transistor arranged in series with a second transistor.

In a fifth implementation form of the device, according to the second aspect as such or any preceding implementation of the second aspect, the device is a semiconductor package.

In a sixth implementation form of the device, according to the second aspect as such or any preceding implementation of the second aspect, the device is a mobile device, a tablet, a cellular phone, a power bank, or a battery pack.

In a seventh implementation form of the device, according to the second aspect as such or any preceding implementation of the second aspect, determining that the coil is operating in the first mode or in the second mode is in accordance with a signal received from an external device.

A third aspect relates to a method that includes having an inductive-capacitive (LC) tank circuit configured to transmit and receive wireless power using a coil of the LC tank circuit, the LC tank circuit having an effective inductance and a first effective capacitance corresponding to transmitting wireless power, the LC tank circuit having the effective inductance and a second effective capacitance corresponding to receiving wireless power.

In a first implementation form of the method according to the third aspect, determining that the LC tank circuit is transmitting wireless power or receiving wireless power is in accordance with a signal received from an external device.

In a second implementation form of the method, according to the third aspect as such or any preceding implementation of the third aspect, the LC tank circuit includes a variable capacitor having a first capacitance value corresponding to the first effective capacitance and the variable capacitor has a second capacitance value corresponding to the second effective capacitance.

In a third implementation form of the method, according to the third aspect as such or any preceding implementation of the third aspect, the method further includes providing a control signal to the variable capacitor to vary a capacitance value of the variable capacitor between the first capacitance value and the second capacitance value in accordance with, respectively, transmitting wireless power or receiving wireless power.

In a fourth implementation form of the method, according to the third aspect as such or any preceding implementation of the third aspect, the LC tank circuit includes a coil used to transmit and receive wireless power. The effective inductance of the LC tank circuit corresponds to an inductance of the coil.

A fourth aspect relates to a method that includes having an inductive-capacitive (LC) tank circuit configured to operate in a transmit mode and a receive mode, respectively, for transmitting and receiving wireless energy. The method further includes arranging components of the LC tank circuit for transmitting wireless energy. The LC tank circuit has an effective inductance and a first effective capacitance. And, the method further includes arranging components of the LC tank circuit for receiving wireless energy. The LC tank circuit has the same effective inductance and a second effective capacitance different than the first effective capacitance.

Embodiments can be implemented in hardware, software, or in any combination thereof.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
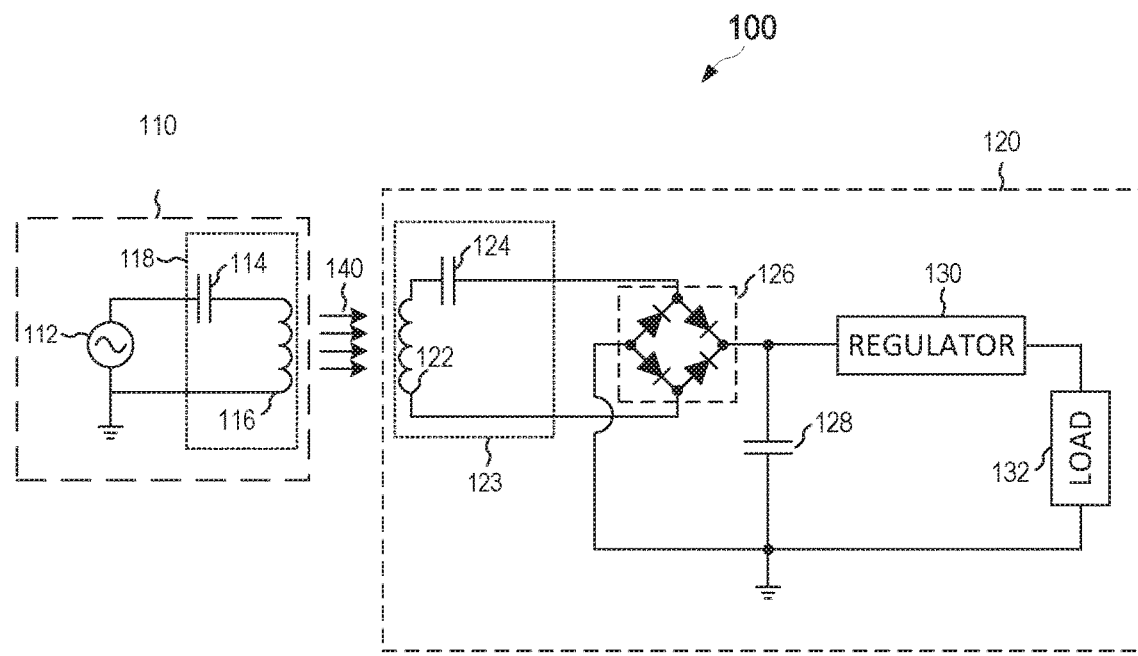
FIG. 1 is a simplified schematic diagram of an embodiment wireless power system.

This disclosure provides many applicable inventive concepts that can be embodied in a wide variety of specific contexts. The specific embodiments are merely illustrative of specific configurations and do not limit the scope of the claimed embodiments. Features from different embodiments may be combined to form further embodiments unless noted otherwise. Variations or modifications described with respect to one of the embodiments may also be applicable to other embodiments. Further, it should be understood that various changes, substitutions, and alterations can be made herein without departing from the spirit and scope of this disclosure as defined by the appended claims.

While the inventive aspects are described primarily in the context of the Qi wireless interface standard for a device having a resonant frequency of around 100 kilohertz (kHz) and an operating frequency of approximately 125 kHz, it should also be appreciated that these inventive aspects may also be applicable to any other type of reverse wireless charging having different resonant and operating frequencies. Thus, the embodiments of this disclosure may be widely used to provide a shared inductive-capacitive (LC) tank circuit in a reverse wireless charging capable device, that can be optimally configured to provide a target resonant frequency in both transmit and receive modes. Further, embodiments of the present invention may operate without complying with the Qi standard.

Generally, a device capable of transmitting and receiving wireless energy has a shared LC tank circuit for operating in each of the transmit and receive operating modes. The LC tank circuit primarily includes a coil and a capacitance. The inductance of the coil in the device is dependent on—yet different from—the inductance of a typical transmit coil. The capacitance of the LC tank circuit is selected to provide a resonant frequency in combination with the inductance for optimal receive mode operation, as the typical use of the device is to charge a battery or to power up the device. Thus, the rigidity in the structure of the shared LC tank circuit, optimized for receive mode, provides weak coupling in transmit mode as the corresponding resonant frequency is shifted over the frequency spectrum from the desired frequency.

Thus, a need exists for an improved system and method to overcome these limitations in a reverse wireless charging capable device. Embodiments of this disclosure provide a system and method that provides a configurable LC tank circuit for each of the transmit and receive operating modes. In other words, the LC tank circuit has a first configuration optimized for receive mode, and a second configuration optimized for transmit mode.

Aspects of this disclosure provide an LC tank circuit that includes a switch used to disconnect or electrically couple a first capacitor from/to a second capacitor. Thus, the switch provides a first configuration corresponding to the receive mode operation, where the first capacitor is disconnected from the second capacitor, and a second configuration corresponding to the transmit mode operation, where the first capacitor is arranged in parallel with the second capacitor. In another embodiment, a variable capacitor is used that has a first value optimized for transmit mode and a second value optimized for receive mode. These and other details are discussed in greater detail below.

FIG. 1 illustrates a simplified schematic diagram of a wireless power system 100. The wireless power system 100 includes a transmitting device 110 and a reverse chargeable device 120. The transmitting device 110 wirelessly transfers power 140 to the reverse chargeable device 120—the reverse chargeable device 120 is operating in receive mode in FIG. 1. The power source 112 generates an alternating current (AC) at the transmit-coil 116, which induces a magnetic field at the coil 122. The induced magnetic field induces an AC voltage at the coil 122 through mutual coupling. The rectifier 126 converts the AC voltage to a DC voltage. The regulator 130 converts the DC voltage from the rectifier 126 to match a desired DC voltage for the load 132.

The transmitting device 110 may be a base station, for example, a charging pad, which provides the inductive power to the reverse chargeable device 120. The transmitting device 110 includes a power source 112, a supply-side capacitor 114, and a transmit-coil 116.

The power source 112 is any device that generates an alternating current (AC) power supplied to the transmit-coil 116. In embodiments, the transmitting device 110 may include a DC-to-AC inverter to provide the AC power.

The transmit-coil 116 may be a loop antenna or a magnetic antenna. The transmit-coil 116 may include a physical core (e.g., ferrite core) or an air core, and may be implemented as an antenna strip or using a Litz wire.

The supply-side capacitor 114 and the transmit-coil 116 combine to form a transmit LC tank circuit 118. The power source 112 drives the transmit LC tank circuit 118, which generates the electromagnetic field at the transmit-coil 116.

The reverse chargeable device 120 may be, for example, a mobile device, a tablet, a cellular phone, a power bank, a battery pack, or other such devices. The reverse chargeable device 120 includes a coil 122, capacitors 124 and 128, a rectifier 126, a regulator 130, and a load 132, which may (or may not) be arranged as shown in FIG. 1. The reverse chargeable device 120 may include additional components not depicted in FIG. 1, such as long-term storage (e.g., non-volatile memory, etc.), a non-transitory computer-readable medium, one or more antenna elements, drivers, demodulators, modulators, filter circuits, and impedance matching circuits.

The coil 122 is similar in feature and structure to the transmit-coil 116 and is arranged in series with the capacitor 124, which in combination form the LC tank circuit 123.

The rectifier 126 is a device that converts alternating current (AC) voltage to a direct current (DC) voltage. The rectifier 126 may be any type of rectifier, such as a low-impedance synchronous rectifier having full-wave or half-wave rectification, or an active rectifier. The rectifier 126 shown in FIG. 1 is a bridge rectifier; however, other types of rectifiers may also be contemplated.

The regulator 130 is a device that maintains a constant output voltage for the load 132. The regulator 130 receives an input voltage from the rectifier 126. The regulator 130 may be any type of voltage regulator, such as a linear regulator (e.g., low drop-out (LDO) linear regulator). In some embodiments, the rectifier 126 and regulator 130 may be part of a switched-mode power supply (SMPS) circuit.

The capacitor 128 is used to decrease any ripple at the input of the regulator 130 from the rectifier 126. The capacitor 128 may be referred to as a smoothing or a reservoir capacitor.

The load 132 receives the transferred power. The load 132 may be a charge storage device, such as a battery. For instance, the load 132 may be a battery of a cellular phone.

Figure 2:
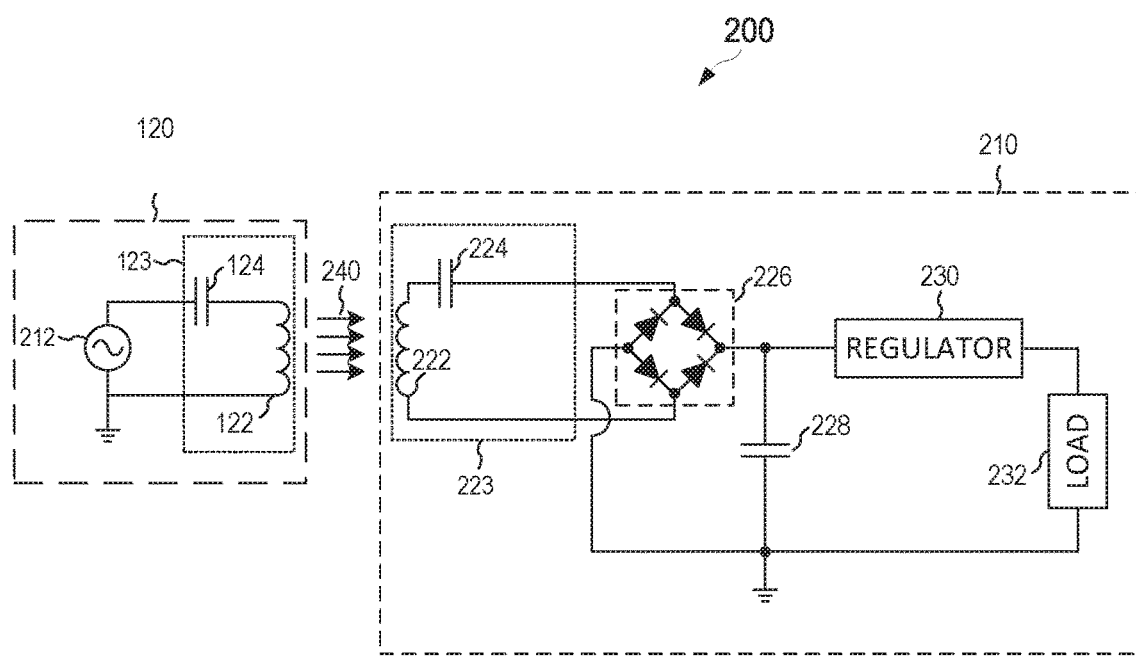
FIG. 2 is a simplified schematic diagram of another embodiment wireless power system.

FIG. 2 illustrates a simplified schematic diagram of a wireless power system 200. The wireless power system 200 includes the reverse chargeable device 120 and a receiving device 210. The reverse chargeable device 120 wirelessly transfers power 240 to the receiving device 210—the reverse chargeable device 120 is operating in transmit mode in FIG. 2. The power source 212 generates an alternating current (AC) at the coil 122, which induces a magnetic field at the receive-coil 222. The induced magnetic field induces an AC voltage at the receive-coil 222 through mutual coupling. The rectifier 226 converts the AC voltage to a DC voltage. The regulator 230 converts the DC voltage to match a desired DC voltage for the load 232. The power source 212 provides the alternating current at the coil 122 using the energy stored in, for example, load 132.

The receiving device 210 may be, for example, a mobile device, a tablet, a cellular phone, a power bank, a battery pack, or other such devices. In some embodiments, the receiving device 210 may be a second reversible charging device operating in receive mode.

The receiving device 210 includes the receive-coil 222, capacitors 224 and 228, the rectifier 226, the regulator 230, and the load 232, which may (or may not) be arranged as shown in FIG. 2. The receive-coil 222, capacitors 224 and 228, the rectifier 226, the regulator 230, and the load 232 are similar to their similarly named counterparts discussed in reference to FIG. 1 and the reverse chargeable device 120. The receiving device 210 may include additional components not depicted in FIG. 2, such as long-term storage (e.g., non-volatile memory, etc.), a non-transitory computer-readable medium, one or more antenna elements, drivers, demodulators, modulators, filter circuits, and impedance matching circuits.

The mutual inductance between the transmitting device 110 and the reverse chargeable device 120 in FIG. 1 depends mainly on the resonant frequency of the transmit LC tank circuit 118 and the LC tank circuit 123 and on the spacing and angle between the transmit-coil 116 and the coil 122. Likewise, the mutual inductance between the reverse chargeable device 120 and the receiving device 210 in FIG. 2 depends primarily on the resonant frequency of the LC tank circuit 123 and the receive LC tank circuit 223 and on the spacing and angle between the coil 122 and the receive-coil 222.

Generally, the performance characteristics of the transmit LC tank circuit 118, the LC tank circuit 123, and the receive LC tank circuit 223 is dependent on interconnects with other integrated circuit components in their respective devices. However, the LC tank circuits in the present disclosure are discussed in isolation and are generalized as the primary power transfer elements of, respectively, the transmitting device 110, the reverse chargeable device 120, and the receiving device 210.

The inductance of the transmit-coil 116, coil 122, and receive-coil 222 generally depend on their windings and physical dimensions. The windings of the coils are typically tightly coupled, and typically the inner diameter of the receive-coil 222 is kept within about 75% to 100% of the inner diameter of the transmit-coil 116 to ensure proper system performance and for improved coupling. In other words, the inductance of the receive-coil 222 depends primarily on the inductance of the transmit-coil 116.

Thus, in the reverse chargeable device 120, the inductance and physical dimensions of the coil 122 are constrained by limitations imposed for operation in receive mode. By extension, the operating characteristics of the LC tank circuit 123 are constrained by these same limitations.

Interface standards regulate wireless power transfer and its related functions and provide a range of operating frequencies for proper power transfer from a transmitting device to a receiving device.

In an embodiment, the equivalent inductance and the equivalent capacitance of the transmit LC tank circuit 118 is selected based on a target resonant frequency for the transmitting device 110. The inductance of the coil 122, as noted previously, depends on the dimensions and value of the transmit-coil 116. The value of the capacitor 124 is then selected to provide an enhanced mutual coupling between the LC tank circuit 123 and the LC tank circuit 118. Typically, as the primary operational goal of a reverse chargeable device 120 is to charge or receive power from the transmitting device 110, for optimal mutual coupling, the LC tank circuit 123 is designed for receive mode operations.

In an embodiment, to operate within the Qi standard, the capacitance and the inductance of the transmit LC tank circuit 118 are, respectively, about 400 nanofarads (nF) and about 6.3 microhenries (pH). The target resonant frequency of the transmitting device, thus, is about 100 kilohertz (kHz). In this embodiment, the inductance of the coil 122 is about 8 PH, and the capacitance of capacitor 124 is about 500 nF to ensure maximum efficiency in wireless power transfer.

Typically, the operating frequency of the transmitting device 110 is set above the resonant frequency of the transmit LC tank circuit 118 to allow adjustments and a level of control over the amount of energy being transferred. Thus, in an embodiment where the transmit LC tank circuit 118 is designed to resonate at a frequency of about 100 kHz, the operating frequency is greater than 110 kHz, for example.

In an embodiment, the resonant frequency of the transmit LC tank circuit 118 is about 100 kHz, and the operating frequency of the transmitting device 110 is about 125 kHz. In this exemplary embodiment, a decrease in the operating frequency from 125 kHz towards the resonant frequency of 100 kHz increases the power delivered to the reverse chargeable device 120. In contrast, an increase in the operating frequency decreases the energy delivered to the reverse chargeable device 120.

The LC tank circuit 123 of FIG. 2 includes the coil 122 and capacitor 124, previously described with FIG. 1. The receive LC tank circuit 223 includes capacitor 224 and receive-coil 222.

The resonant frequency (f) of a tank circuit can be approximated using the equation:

$$f = \frac{1}{2\pi \times \sqrt{LC}},$$

where L is the inductance and C is the capacitance of the tank circuit.

It should be appreciated that the value of the components and the resonant frequency may be determined by other means, such as empirical observations, for example, on a test bench.

In an embodiment where the inductance of the coil 122 is about 8 PH, and the capacitance of capacitor 124 is about 500 nF, the resonant frequency of the LC tank circuit 123 in transmit mode is approximately around 80 kHz, which is a shift of roughly 20% in the frequency spectrum from the desired resonant frequency of 100 kHz.

As the receive LC tank circuit 223 of the receiving device 210 would be designed for compatibility with the Qi standard of about 100 kHz, the shift in the resonant frequency reduces mutual coupling, resulting in reduced power transfer efficiency and increased charge time for the wireless power system 200.

Embodiments of this disclosure provide a solution for improving mutual coupling in the reverse chargeable device 120 by providing a tank circuit that can be separately configured in each of the transmit and receive operating modes.

Figure 3A:
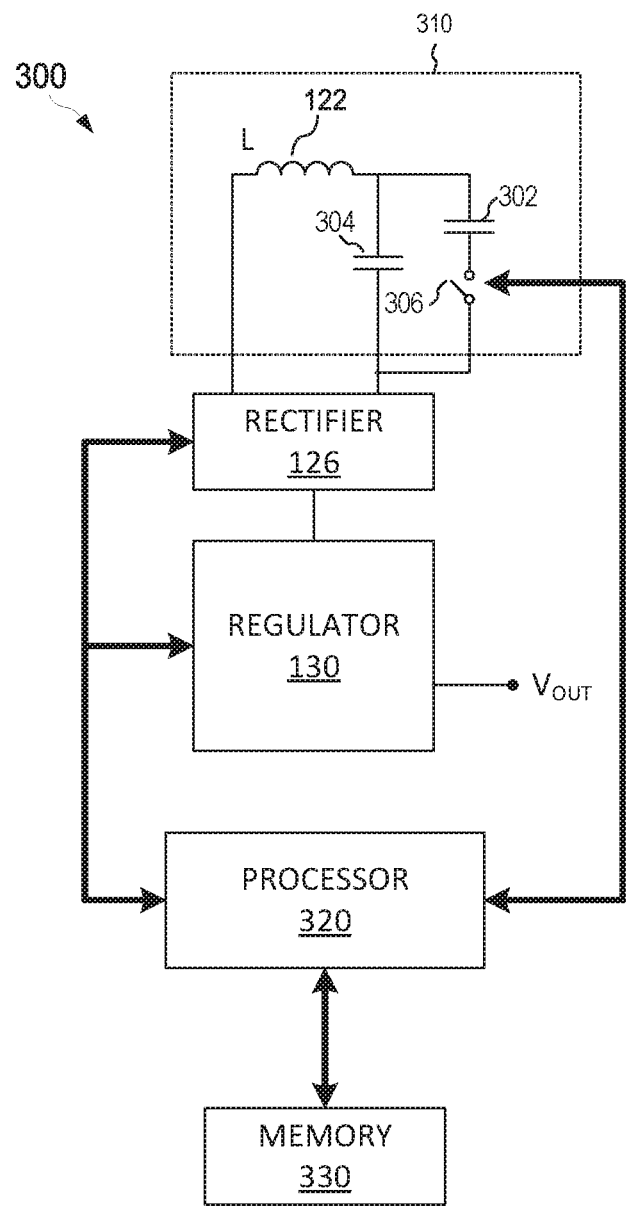
FIG. 3A is a simplified block diagram of an embodiment reverse chargeable device.

FIG. 3A illustrates a simplified block diagram of an embodiment reverse chargeable device 300. The reverse chargeable device 300 may be used in place of the reverse chargeable device 120 in either wireless power system 100 or 200. The reverse chargeable device 300, advantageously includes an LC tank circuit 310 that can be selectively configured for operation in the transmit or receive modes.

The LC tank circuit 310, in addition to the coil 122, includes a switch 306 arranged in series with a capacitor 302. The series switch 306 and capacitor 302 are arranged in parallel with the capacitor 304. The switch 306 receives a control signal from the processor 320 to electrically couple or disconnect the capacitor 302 from the LC tank circuit 310. The capacitor 302 is shown as a single capacitor, but in embodiments, the capacitor 302 may include one or more capacitors arranged in series or parallel with each other.

The processor 320 can be, for example, a microprocessor, a microcontroller, a digital signal processor, a field-programmable gate array (FPGA), or an application-specific integrated circuit (ASIC). The reverse chargeable device 300 is shown to have a single processor; however, in some embodiments, multiple processors may be included, and the various functions herein attributed to the processor 320 may be distributed across these multiple processors.

The memory 330 may be configured to store data, programs, firmware, operating systems, and other information and to make the data, programs, firmware, operating systems, and additional information accessible to the processor 320. The memory 330 may include any type of non-transitory system memory such as static random access memory (SRAM), dynamic random access memory (DRAM), synchronous DRAM (SDRAM), read-only memory (ROM), or a combination thereof. In an embodiment, the memory 330 may include ROM for use at boot-up, and DRAM for program, firmware, and data storage for use while executing programs. The memory 330 may include, for example, one or more of a solid-state drive, hard disk drive, a magnetic disk drive, a removable memory drive, or an optical disk drive.

The processor 320 provides a control signal to close or open the switch 306 based on the operating mode of the reverse chargeable device 120. When switch 306 is in the closed position, the equivalent capacitance of the LC tank circuit 310 is the sum of the capacitance values of capacitors 302 and 304. Conversely, when the switch 306 is the open position, the equivalent capacitance of the LC tank circuit 310 is equal to the capacitance of the capacitor 304.

The equivalent capacitance of the LC tank circuit 310 can be approximately determined using the equation:

$$C = \frac{1}{4\pi^2 \times f^2 \times L},$$

where C, f, and L are, respectively, the equivalent capacitance, the inductance, and the resonant frequency of the LC tank circuit 310.

In an embodiment where the resonant frequency of the tank circuit is desired to be around 100 kHz in transmit mode and the inductance of the coil 122 is about 8 μH, the equivalent capacitance of the LC tank circuit 310 is approximately 300 nF. In such an embodiment, as the equivalent capacitance of the LC tank circuit 310 is desired to be around 500 nF to ensure maximum efficiency in the receive mode, the capacitance values of capacitors 304 and 302 are, respectively, approximately 300 nF (as calculated) and 200 nF (e.g., 500 nF-300 nF). In this embodiment, in receive mode, the switch 306 is in the closed position to provide an equivalent capacitance for the LC tank circuit 310 of approximately 500 nF. And, in transmit mode, the switch 306 is in the open position to provide an equivalent capacitance for the LC tank circuit 310 of approximately 300 nF.

Thus, the LC tank circuit 310 can provide better coupling with the transmitting device 110 and with the receiving device 210 by, respectively, electrically coupling and decoupling the capacitor 302 with the capacitor 304 within the LC tank circuit 310. The selective disconnecting or electrically coupling provides a resonant frequency for the LC tank circuit 310 that is appropriate to the operating mode of the reverse chargeable device 120.

It is noted that the switch 306 is shown to be arranged in series with the capacitor 302; however, in some embodiments, the switch 306 may be arranged in series with the capacitor 304. In such an embodiment, switch 306 is in the closed position for the receive mode operation, and the switch 306 is the open position for the transmit mode operation. And, the values of the capacitors 304 and 302 are selected appropriately for this modified operation.

The equivalent capacitance values presented herein are exemplary values, and appropriate numbers can be determined for any desired resonant frequency.

Figure 3B:
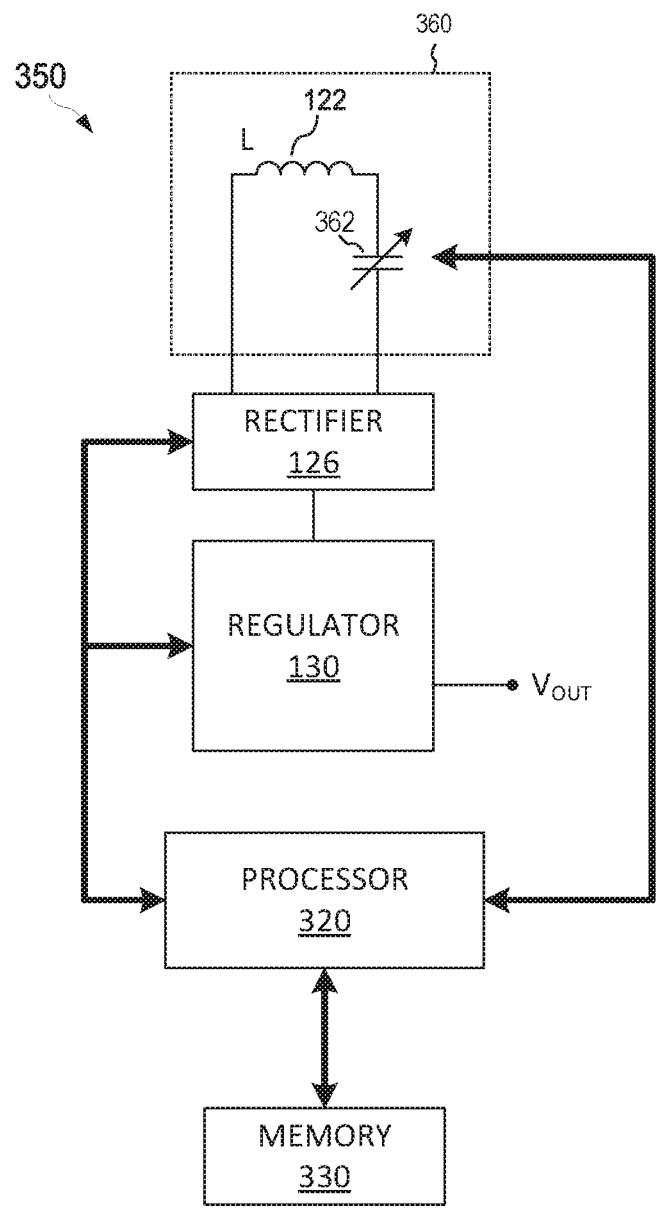
FIG. 3B is a simplified block diagram of another embodiment reverse chargeable device.

FIG. 3B illustrates a simplified block diagram of another embodiment reverse chargeable device 350. The reverse chargeable device 350, similar to the reverse chargeable device 300, may be used in place of the reverse chargeable device 120 in either wireless power system 100 or 200. The reverse chargeable device 350, advantageously includes an LC tank circuit 360 that can be configured for operation in the transmit or receive modes.

The LC tank circuit 360 includes the coil 122 and a variable capacitor 362. The variable capacitor 362 can be adjusted using a signal from the processor 320. In an embodiment, the variable capacitor is set to operate at a first capacitance value to provide a resonant frequency in transmit mode. In the embodiment, the variable capacitor is configured to operate at a second capacitive value in receive mode.

In an exemplary embodiment, the coil 122 has an inductance value of about 8 PH, and the variable capacitor 362 has a capacitance value of about 300 nF in transmit mode. In the exemplary embodiment, the variable capacitor 362 has a capacitance value of about 500 nF in receive mode.

Figure 4:
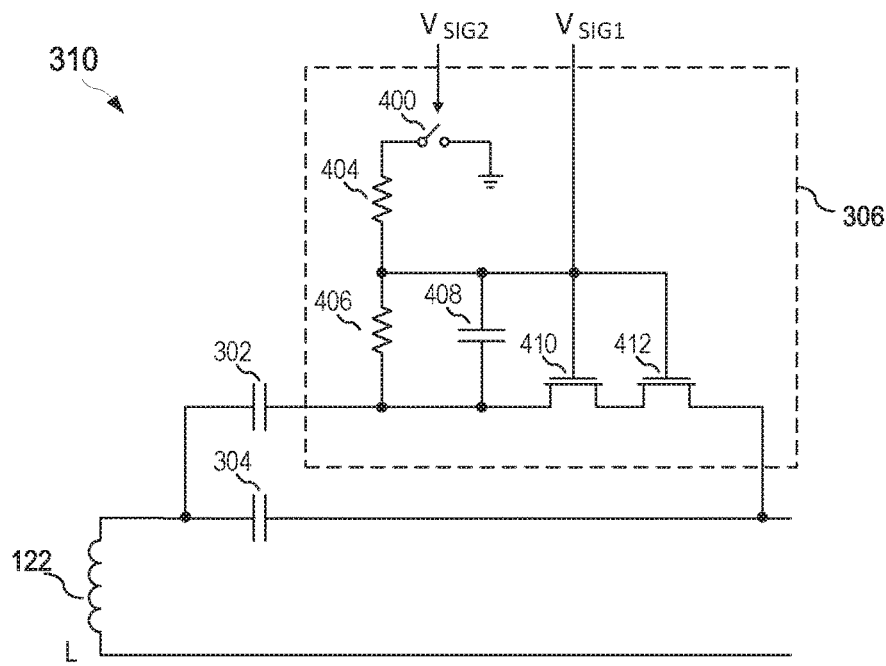
FIG. 4 is a schematic of an inductive-capacitive (LC) tank circuit.

FIG. 4 illustrates an exemplary schematic of the LC tank circuit 310. The LC tank circuit includes the coil 122, the capacitors 302 and 304, and the switch 306. The switch 306 includes resistors 404 and 406, capacitor 408, switch 400, and transistors 410 and 412.

The exemplary circuit illustrated in FIG. 4, representing the switch 306 of FIG. 3A, is non-limiting, and other circuits that serve similar operational characteristics are contemplated.

The transistors 410 and 412 are arranged as back-to-back transistors, where the drain terminal of the transistor 410 is electrically coupled with the source terminal of the transistor 412. The source terminal of the transistor 412 is electrically coupled to the capacitor 302. The drain terminal of the transistor 412 is electrically coupled with the capacitor 302. The gate of each transistor 410 and 412 are electrically coupled to the processor 320.

The gate of each transistor 410 and 412 is electrically coupled to the source of the transistor 410, which can be electrically coupled to a reference ground through the switch 400—to reduce leakage at the reverse chargeable device in the transmit mode. In embodiments, the switch 400 is electrically coupled to a reference voltage, and not necessarily a reference ground, that has less voltage potential than the terminal of the switch electrically coupled to the resistor 404. The processor 320 is electrically coupled to the gate of the transistor 410, the transistor 412, and the switch 400. The processor 320 provides a signal $V_{SIG1}$ to activate or deactivate the transistors 410 and 412 and the switch 400. The switch 400 is electrically coupled to the processor 320 and transitions between an open and closed mode depending on the signal $V_{SIG2}$ received from the processor 320.

In an embodiment corresponding to the reverse chargeable device 120 being in transmit mode, the switch 400 is in an open position, and the transistor 410 and the transistor 412 are deactivated. In this embodiment, the equivalent capacitance of the LC tank circuit 310 is approximately equal in value to the capacitance of the capacitor 304.

In an exemplary embodiment, the inductance value of the coil 122 is approximately 8 pH, and the capacitance value of the capacitor 304 is about 300 nF. In this exemplary embodiment, the capacitance value of the LC tank circuit 310 in transmit mode is, thus, 300 nF. The adjustment to the capacitance of the LC tank circuit 310 from the typical 500 nF to 300 nF, in an operating environment corresponding to an operating voltage of 10 V, an operating frequency of 125 kHz, and with a 10 ohm load, provides an approximately 60% increase in power transfer from about 8 watts (W) to about 12.7 W in transmit mode.

In an embodiment where the reverse chargeable device 120 is in receive mode, the switch 400 is in a closed position, and the transistor 410 and the transistor 412 are activated. In this embodiment, the equivalent capacitance of the LC tank circuit 310 is approximately equal in value to the sum of the capacitance of the capacitors 302 and 304.

In an exemplary embodiment, the inductance value of the coil 122 is approximately 8 pH, and the capacitance value of the capacitors 302 and 304, respectively, are about 300 nF and 200 nF. In this exemplary embodiment, the capacitance value of the LC tank circuit 310 in receive mode is, thus, 500 nF. As the capacitance of the LC tank circuit 310 remains within the preferred 500 nF range in receive mode, the power transfer remains relatively unchanged apart from a small and negligible amount of energy lost through leakage within the switch 306.

Figure 5:
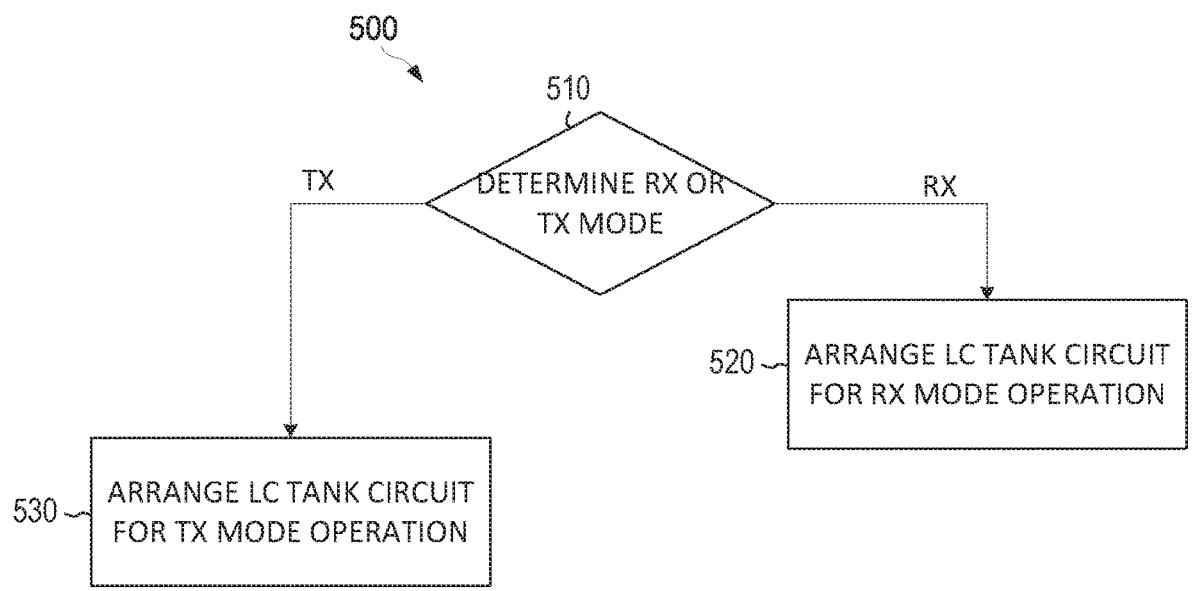
FIG. 5 is a flowchart of an embodiment method of operating a reverse chargeable device.

FIG. 5 illustrates a flowchart of an embodiment method 500 for operating an LC tank circuit, as may be performed by the reverse chargeable device 120. At step 510, the processor 320 determines whether the reverse chargeable device 120 is operating in a first mode corresponding to receiving wireless energy from a transmitting device 110 or a second mode corresponding to transmitting wireless power to a receiving device 210. In embodiments, the determining as to whether the device is operating in the first mode or the second mode is in response to a signal received from an external device, such as the transmitting device 110 or the receiving device 210. In embodiments, the signal is an electromagnetic field generated by the external device. In other embodiments, the signal is a communication signal received from the external device, such as a near field communication.

At step 520, the processor 320 arranges the LC tank circuit 310 to operate in receive mode. In an embodiment, the processor 320 activates the switch 306 to arrange the coil 122 in series with a parallel configuration of the capacitors 302 and 304 in the LC tank circuit 310. In another embodiment, the processor 320 activates a variable capacitor 362 to provide a first capacitance value corresponding to proper operation in receive mode.

At step 530, the processor 320 arranges the LC tank circuit 310 to operate in transmit mode. In an embodiment, the processor 320 deactivates the switch 306 to arrange the coil 122 in series with the capacitor 302—and disconnects the capacitor 304—in the LC tank circuit 310. In another embodiment, the processor 320 activates the variable capacitor 362 to provide a second capacitance value corresponding to proper operation in transmit mode.

It is noted that the order of steps shown in FIG. 5 is not absolutely required, so in principle, the various steps may be performed out of the illustrated order. Also, specific steps may be skipped, different steps may be added or substituted, or selected steps or groups of steps may be performed in a separate application.

In the present description, when reference is made to terms qualifying absolute positions, such as terms "front," "back," "top," "bottom," "left," "right," etc., or relative positions, such as terms "above," "under," "upper," "lower," etc., or to terms qualifying directions, such as terms "horizontal," "vertical," etc., it is referred to the orientation of the drawings. Unless otherwise specified, the terms "approximately," "substantially," "about," and "in the order of" are used herein to designate a tolerance of plus or minus 10%, preferably of plus or minus 5%, of the value in question.

Unless otherwise specified, when reference is made to two elements electrically connected together, this means that the elements are directly connected with no intermediate element other than conductors. When reference is made to two elements electrically coupled together, this means that the two elements may be directly coupled (connected) or coupled via one or a plurality of other elements.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method of operating a power circuit, the method comprising:
    having a first mode and a second mode, respectively, corresponding to receiving and transmitting power using inductive charging at a coil of the power circuit, the power circuit further comprising:
        a first capacitor having a first node coupled to the coil;
        a second capacitor having a first node coupled to the coil;
        a circuit comprising:
            a first resistor having a first node coupled to a second node of the second capacitor,
            a second resistor having a first node coupled to a second node of the first resistor,
            a switch having a first node coupled to a second node of the second resistor and a second node coupled to a reference ground,
            a third capacitor having a first node coupled to the first node of the first resistor and a second node coupled to the second node of the second resistor,
            a first transistor, a gate terminal of the first transistor coupled to the second node of the first resistor, a source terminal of the first transistor coupled to the first node of the first resistor, and
            a second transistor, a gate terminal of the second transistor coupled to the gate terminal of the first transistor, a source terminal of the second transistor coupled to a drain terminal of the first transistor, and a drain terminal of the second transistor coupled to a second node of the first capacitor;
    determining that the power circuit is operating in the first mode, and, based thereon, arranging the switch in a close position, and activating the first transistor and the second transistor; and
    determining that the power circuit is operating in the second mode, and, based thereon, configuring the switch in an open position, and deactivating the first transistor and the second transistor.

2. The method of claim 1, wherein a tank circuit of the power circuit in the second mode comprises the coil in series with the first capacitor, wherein an equivalent capacitance and inductance, respectively, of the tank circuit in the second mode is about 300 nanofarad and 8 microhenries.

3. The method of claim 2, wherein a resonant frequency of the power circuit is determined in accordance with an equivalent inductance and capacitance of the tank circuit.

4. The method of claim 1, wherein the determining that the power circuit is operating in the first mode or the second mode is in accordance with a signal received from an external device.

5. The method of claim 1, wherein a tank circuit of the power circuit in the first mode comprises the coil in series with a parallel configuration of the first capacitor and the second capacitor, wherein an equivalent capacitance and inductance, respectively, of the tank circuit in the first mode is about 500 nanofarad and 8 microhenries.

6. The method of claim 1, wherein the second capacitor is a variable capacitor.

7. A device comprising:
a first capacitor;
a second capacitor having a first node coupled to a first node of the first capacitor;
a coil configured to operate in a first mode and a second mode, respectively, corresponding to receiving and transmitting power using inductive charging;
a circuit comprising:
 a first resistor having a first node coupled to a second node of the second capacitor,
 a second resistor having a first node coupled to a second node of the first resistor,
 a switch having a first node coupled to a second node of the second resistor and a second node coupled to a reference ground,
 a third capacitor having a first node coupled to the first node of the first resistor and a second node coupled to the second node of the second resistor,
 a first transistor, a gate terminal of the first transistor coupled to the second node of the first resistor, a source terminal of the first transistor coupled to the first node of the first resistor, and
 a second transistor, a gate terminal of the second transistor coupled to the gate terminal of the first transistor, a source terminal of the second transistor coupled to a drain terminal of the first transistor, and a drain terminal of the second transistor coupled to a second node of the first capacitor;
a non-transitory memory storage comprising instructions; and
a processor in communication with the non-transitory memory storage, wherein the processor executes the instructions to:
 determine that the coil is operating in the first mode, and, based thereon, configure the switch in a close position, and activate the first transistor and the second transistor, and
 determine that the coil is operating in the second mode, and, based thereon, configure the switch in an open position, and deactivate the first transistor and the second transistor.

8. The device of claim 7, wherein in the second mode the coil is in series with the first capacitor, wherein an equivalent capacitance and inductance, respectively, of a tank circuit comprising the first capacitor, the second capacitor, and the coil in the second mode is about 300 nanofarad and 8 microhenries.

9. The device of claim 7, wherein the device is a semiconductor package.

10. The device of claim 7, wherein the device is a mobile device, a tablet, a cellular phone, a power bank, or a battery pack.

11. The device of claim 7, wherein determining that the coil is operating in the first mode or in the second mode is in accordance with a signal received from an external device.

12. The device of claim 7, wherein the second capacitor is a variable capacitor.

13. A method comprising:
having an inductive-capacitive (LC) tank circuit to transmit and receive wireless power using a coil of the LC tank circuit, the LC tank circuit further comprising:
a first capacitor having a first node coupled to the coil;
a second capacitor having a first node coupled to the coil;
a circuit comprising:
 a first resistor having a first node coupled to a second node of the second capacitor,
 a second resistor having a first node coupled to a second node of the first resistor,
 a switch having a first node coupled to a second node of the second resistor and a second node coupled to a reference ground,
 a third capacitor having a first node coupled to the first node of the first resistor and a second node coupled to the second node of the second resistor,
 a first transistor, a gate terminal of the first transistor coupled to the second node of the first resistor, a source terminal of the first transistor coupled to the first node of the first resistor, and
 a second transistor, a gate terminal of the second transistor coupled to the gate terminal of the first transistor, a source terminal of the second transistor coupled to a drain terminal of the first transistor, and a drain terminal of the second transistor coupled to a second node of the first capacitor;
arranging the LC tank circuit to have an effective inductance and a first effective capacitance corresponding to transmitting wireless power, the arranging comprising setting the switch in an open position and deactivating the first transistor and the second transistor; and
arranging the LC tank circuit to have the effective inductance and a second effective capacitance corresponding to receiving wireless power, the arranging comprising setting the switch in a closed position and activating the first transistor and the second transistor.

14. The method of claim 13, further comprising determining that the LC tank circuit is transmitting wireless power or receiving wireless power in accordance with a signal received from an external device.

15. The method of claim 13, wherein the LC tank circuit comprises a variable capacitor, wherein the variable capacitor has a first capacitance value corresponding to the first effective capacitance, and wherein the variable capacitor has a second capacitance value corresponding to the second effective capacitance.

16. The method of claim 15, wherein the method further comprises providing a control signal to the variable capacitor to vary a capacitance value of the variable capacitor between the first capacitance value and the second capacitance value in accordance with, respectively, transmitting wireless power or receiving wireless power.

17. The method of claim 13, wherein the LC tank circuit comprises a coil used to transmit and receive wireless power, wherein the effective inductance of the LC tank circuit corresponds to an inductance of the coil.

18. A method comprising:
having an inductive-capacitive (LC) tank circuit configured to operate in a transmit mode and a receive mode, respectively, for transmitting and receiving wireless energy, the LC tank circuit comprising:
a coil;
a first capacitor having a first node coupled to the coil;
a second capacitor having a first node coupled to the coil;
a circuit comprising:
 a first resistor having a first node coupled to a second node of the second capacitor,
 a second resistor having a first node coupled to a second node of the first resistor, a switch having a first node coupled to a second node of the second resistor and a second node coupled to a reference ground, a third capacitor having a first node coupled to the first node of the first resistor and a second node coupled to the second node of the second resistor, a first transistor, a gate terminal of the first transistor coupled to the second node of the first resistor, a source terminal of the first transistor coupled to the first node of the first resistor, and a second transistor, a gate terminal of the second transistor coupled to the gate terminal of the first transistor, a source terminal of the second transistor coupled to a drain terminal of the first transistor, and a drain terminal of the second transistor coupled to a second node of the first capacitor;

arranging the switch in an open position and deactivating the first transistor and the second transistor in response to operating LC tank circuit for transmitting wireless energy; and arranging the switch in a close position and activating the first transistor and the second transistor in response to operating the LC tank circuit for receiving wireless energy.

19. The method of claim 18, further comprising determining that the coil is operating in in the transmit mode or the receive mode based on a signal received from an external device.

20. The method of claim 18, wherein the LC tank circuit in the transmit mode comprises the coil in series with the first capacitor, wherein an equivalent capacitance and inductance, respectively, of the tank circuit in the transmit mode is about 300 nanofarad and 8 microhenries.

21. The method of claim 18, wherein the LC tank circuit in the receive mode comprises the coil in series with a parallel arrangement of the first capacitor and the second capacitor, wherein an equivalent capacitance and inductance, respectively, of the tank circuit in the receive mode is about 500 nanofarad and 8 microhenries.

* * * * *